(12) United States Patent
Rusu et al.

(10) Patent No.: US 7,144,152 B2
(45) Date of Patent: Dec. 5, 2006

(54) APPARATUS FOR THERMAL MANAGEMENT OF MULTIPLE CORE MICROPROCESSORS

(75) Inventors: Stefan Rusu, Sunnyvale, CA (US); Simon M. Tam, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/035,467

(22) Filed: Jan. 13, 2005

(65) Prior Publication Data

US 2005/0180488 A1    Aug. 18, 2005

Related U.S. Application Data

(63) Continuation of application No. 10/227,125, filed on Aug. 23, 2002, now Pat. No. 6,908,227.

(51) Int. Cl.
*G01K 1/08* (2006.01)
(52) U.S. Cl. ...................... 374/141; 374/117
(58) Field of Classification Search ............... 713/322, 713/320; 331/66, 57; 374/170–171, 141, 374/117
See application file for complete search history.

(56) References Cited

U.S. PATENT DOCUMENTS

| | | | |
|---|---|---|---|
| 4,079,338 A * | 3/1978 | Kronlage .................... 331/157 |
| 4,150,573 A * | 4/1979 | Iinuma et al. ............... 374/185 |
| 4,300,048 A * | 11/1981 | Barbier et al. ............ 250/338.1 |
| 4,549,818 A * | 10/1985 | Nishikubo et al. .......... 374/178 |
| 4,551,031 A * | 11/1985 | Ishikawa et al. ............ 374/117 |
| 5,021,679 A | 6/1991 | Fairbanks et al. |
| 5,046,858 A * | 9/1991 | Tucker ....................... 374/179 |
| 5,153,535 A | 10/1992 | Fairbanks et al. |
| 5,287,292 A * | 2/1994 | Kenny et al. ................ 702/132 |
| 5,307,003 A | 4/1994 | Fairbanks et al. |
| 5,373,254 A | 12/1994 | Nakauchi et al. |
| 5,392,437 A | 2/1995 | Matter et al. ................ 713/324 |
| 5,422,806 A * | 6/1995 | Chen et al. .................... 700/29 |
| 5,490,059 A * | 2/1996 | Mahalingaiah et al. ..... 713/501 |
| 5,495,617 A | 2/1996 | Yamada ...................... 713/323 |
| 5,499,214 A * | 3/1996 | Mori et al. ................. 365/222 |
| 5,502,838 A * | 3/1996 | Kikinis ........................ 713/501 |
| 5,544,120 A * | 8/1996 | Kuwagata et al. .......... 365/222 |
| 5,557,551 A | 9/1996 | Craft .......................... 702/130 |
| 5,627,412 A | 5/1997 | Beard |
| 5,638,418 A * | 6/1997 | Douglass et al. ............. 377/25 |
| 5,719,800 A | 2/1998 | Mittal et al. ................ 713/321 |
| 5,723,998 A | 3/1998 | Saito et al. |

(Continued)

FOREIGN PATENT DOCUMENTS

EP    0 549 165 A2    6/1993

(Continued)

OTHER PUBLICATIONS

U.S. Appl. No. 09/471,795; filed Dec. 23, 1999, "Microprocessor with Digital Power Throttle," 31 pages including Figures.

(Continued)

*Primary Examiner*—Yaritza Guadalupe-McCall
(74) *Attorney, Agent, or Firm*—Blakely, Sokoloff, Taylor & Zafman LLP

(57) ABSTRACT

An apparatus for managing the temperature of an integrated circuit having a multiple core microprocessor is described. Specifically, thermal sensors are placed at potential hot spots throughout each microprocessor core. A thermal management unit monitors the thermal sensors. If a thermal sensor identifies a hot spot, the thermal management unit adjusts the operating frequency and voltage of that microprocessor core accordingly.

21 Claims, 3 Drawing Sheets

U.S. PATENT DOCUMENTS

| | | | |
|---|---|---|---|
| 5,727,193 A * | 3/1998 | Takeuchi | 713/501 |
| 5,745,375 A * | 4/1998 | Reinhardt et al. | 700/286 |
| 5,752,011 A | 5/1998 | Thomas et al. | |
| 5,766,228 A | 6/1998 | Bonnet et al. | |
| 5,781,783 A | 7/1998 | Gunther et al. | |
| 5,798,667 A * | 8/1998 | Herbert | 327/573 |
| 5,815,724 A | 9/1998 | Mates | 713/322 |
| 5,822,369 A | 10/1998 | Araki | |
| 5,825,674 A * | 10/1998 | Jackson | 713/321 |
| 5,829,879 A | 11/1998 | Sanchez et al. | |
| 5,832,284 A * | 11/1998 | Michail et al. | 713/322 |
| 5,835,885 A * | 11/1998 | Lin | 702/99 |
| 5,838,578 A * | 11/1998 | Pippin | 716/4 |
| 5,902,044 A * | 5/1999 | Pricer et al. | 374/112 |
| 5,940,785 A * | 8/1999 | Georgiou et al. | 702/132 |
| 5,940,786 A * | 8/1999 | Steeby | 702/132 |
| 5,964,881 A | 10/1999 | Thor | |
| 5,974,557 A | 10/1999 | Thomas et al. | |
| 6,029,006 A | 2/2000 | Alexander et al. | 713/323 |
| 6,047,248 A | 4/2000 | Georgiou et al. | |
| 6,078,356 A | 6/2000 | Jensen | |
| 6,091,255 A * | 7/2000 | Godfrey | 324/760 |
| 6,105,142 A * | 8/2000 | Goff et al. | 713/324 |
| 6,172,611 B1 * | 1/2001 | Hussain et al. | 340/584 |
| 6,192,479 B1 | 2/2001 | Ko | 713/300 |
| 6,211,740 B1 | 4/2001 | Dai et al. | 331/2 |
| 6,216,235 B1 | 4/2001 | Thomas et al. | |
| 6,219,796 B1 | 4/2001 | Bartley | 713/320 |
| 6,363,490 B1 * | 3/2002 | Senyk | 713/300 |
| 6,393,374 B1 * | 5/2002 | Rankin et al. | 702/132 |
| 6,407,595 B1 | 6/2002 | Huang et al. | |
| 6,415,388 B1 * | 7/2002 | Browning et al. | 713/322 |
| 6,460,005 B1 * | 10/2002 | Chang | 702/132 |
| 6,470,289 B1 * | 10/2002 | Peters et al. | 702/132 |
| 6,487,668 B1 | 11/2002 | Thomas et al. | |
| 6,559,631 B1 | 5/2003 | Balch et al. | |
| 6,564,328 B1 * | 5/2003 | Grochowski et al. | 713/320 |
| 6,608,528 B1 * | 8/2003 | Tam et al. | 331/2 |
| 6,695,475 B1 * | 2/2004 | Yin | 374/171 |
| 6,718,474 B1 * | 4/2004 | Somers et al. | 713/322 |
| 6,762,629 B1 * | 7/2004 | Tam et al. | 327/114 |
| 6,788,156 B1 * | 9/2004 | Tam et al. | 331/49 |
| 6,789,037 B1 * | 9/2004 | Gunther et al. | 702/132 |
| 6,804,632 B1 * | 10/2004 | Orenstien et al. | 702/188 |
| 6,893,154 B1 * | 5/2005 | Gold et al. | 374/117 |
| 2001/0021217 A1 * | 9/2001 | Gunther et al. | 374/178 |
| 2002/0007463 A1 * | 1/2002 | Fung | 713/320 |
| 2002/0084905 A1 | 7/2002 | Nale et al. | |
| 2002/0140467 A1 * | 10/2002 | Naffziger et al. | 327/113 |
| 2002/0143488 A1 * | 10/2002 | Copper et al. | 702/132 |
| 2003/0065960 A1 * | 4/2003 | Rusu et al. | 713/200 |
| 2003/0110012 A1 * | 6/2003 | Orenstien et al. | 702/188 |
| 2003/0126478 A1 * | 7/2003 | Burns et al. | 713/200 |
| 2003/0126479 A1 * | 7/2003 | Burns et al. | 713/300 |
| 2003/0155903 A1 * | 8/2003 | Gauthier et al. | 324/76.41 |

FOREIGN PATENT DOCUMENTS

| | | |
|---|---|---|
| EP | 0592783 A2 | 4/1994 |
| WO | WO 99/17186 | 4/1999 |

OTHER PUBLICATIONS

U.S. Appl. No. 10/206,610, filed Jul. 26, 2002, "A VCC Adaptive Dynamically Variable Frequency Clock System for High Performance, Low Power Microprocessors," 48 pages total.

U.S. Appl. No. 10/041,092, filed Dec. 28, 2001, "Digital Throttle for Multiple Operating Points," 30 pages including Figures.

U.S. Appl. No. 10/041,013, filed Dec. 28, 2001, "Multiple Mode Power Throttle Mechanism," 32 pages including Figures.

U.S. Appl. No. 10/044,865, filed Oct. 22, 2001, "An Adaptive Variable Frequency Clock System for High Performance Low Power Microprocessors," 35 pages including Figures.

Anonymous: "Conversion of thermal-diode measurement to analog reading," Research Disclosure, Kenneth Mason Publications, Hampshire, GB, vol. 429, No. 67, Jan. 2000, XP007125352, ISSN: 0374-4353, 1 page.

Int'l Search Report, Int'l application No. PCT/US03/26429, mailed Jul. 9, 2004, 6 pages.

PCT Written Opinion, PCT US03/26429, Int'l. filing date Aug. 21, 2003, date mailed Aug. 26, 2006, 10 pages.

* cited by examiner

APPARATUS FOR THERMAL MANAGEMENT OF MULTIPLE CORE MICROPROCESSORS

The present patent application is a Continuation of application Ser. No. 10/227,125, filed on Aug. 23, 2002 now U.S. Pat. No. 6,908,227, entitled "An Apparatus for Thermal Management of Multiple Core Microprocessors," assigned to the corporate assignee of the present invention and incorporated herein by reference.

FIELD OF THE INVENTION

The present invention pertains to the field of integrated circuit design. More particularly, the present invention relates to a method and apparatus for the management for thermal and power management of multiple processor cores on a single die.

BACKGROUND OF THE INVENTION

An integrated circuit (IC) is a device consisting of a number of connected circuit elements, such as transistors and resistors, fabricated on a single chip of silicon crystal or other semiconductor material. During operation, an IC consumes power causing the temperature of the IC to increase. An overheated IC can potentially result in reduced performance and even operation failure.

A microprocessor is an example of an IC. Because of higher operating frequencies, the trend in microprocessors is toward increased power consumption and dissipation with every new micro-architecture. In particular, server class processors having multiple processor cores are typically power limited by increasing processor density. A processor core typically includes an instruction register, an input/output bus, a floating point unit, an integer execution unit, a L0 cache, and a L1 cache.

To help reduce power dissipation, thermal and power management of multiple processor cores on a single IC is desired. The goal is to achieve maximum compute throughput while keeping the junction temperature below the reliability limit for each processor core.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1A:
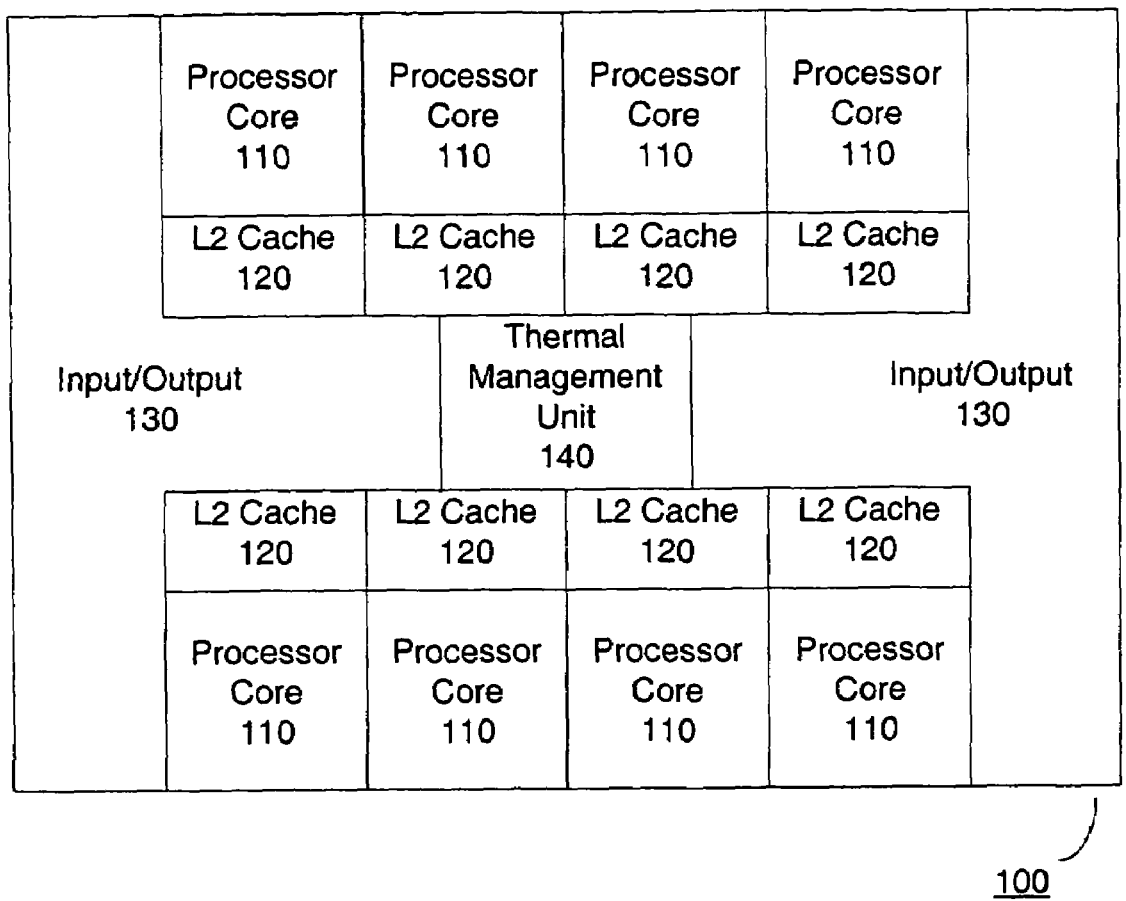
FIG. 1A is one embodiment of a multiple core processor floor plan having multiple on die thermal sensors.
Figure 1B:
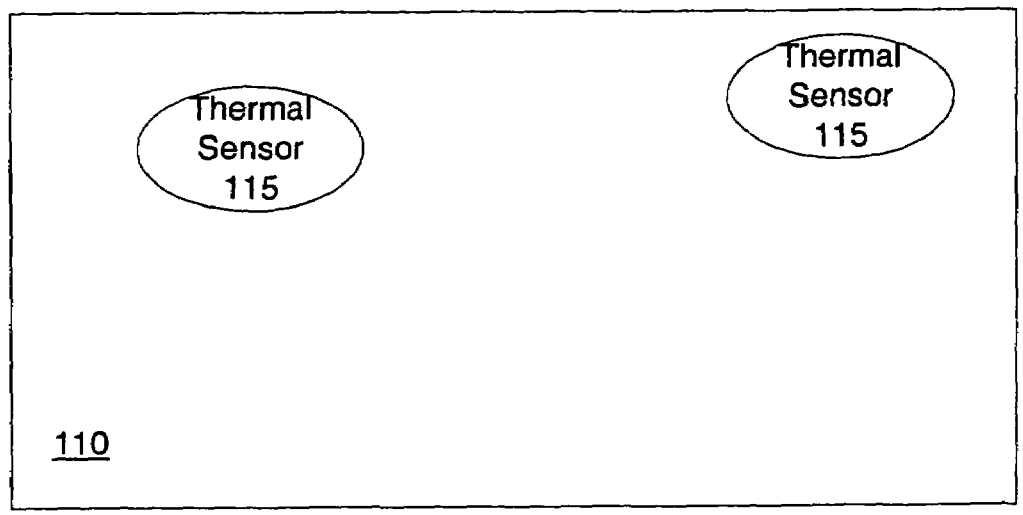
FIG. 1B is one embodiment of a processor core having a plurality of thermal sensors.

FIG. 1A depicts a multiple core processor 100 having multiple on-die thermal sensors. For this embodiment of the invention, the multiple core processor 100 comprises eight processor cores 110. Each of the processor cores 110 is an isolated processor or processing unit. The multiple core processor is not limited to having eight processor cores. A processor core may comprise a floating point unit, an integer execution unit, a L0 cache, and a L1 cache. In addition, a processor core 110 may comprise a plurality of thermal sensors 115. A processor core comprising a plurality of thermal sensors 115 is depicted in FIG. 1B.

For this embodiment of the invention, each of the processor cores 110 is coupled to an L2 cache 120. The processor cores 110, however, are not limited to having an individual L2 cache 120. For example, the processor cores 110 may be coupled to a single cache.

The processor cores 110 and L2 caches 120 are coupled to an input/output (I/O) 130 and a thermal management unit (TMU) 140. The I/O 130 serves as a hardware interface between the multiple core processor and external devices. The TMU 140 is located in a central location of the die and receives the outputs of the thermal sensors 115. The thermal sensors 115 may be placed near hot spots of a processor core 110, such as the floating point unit or the integer execution unit. A processor core 110 may have a number of hot spots. Thus, a plurality of thermal sensors 115 may be used for each processor core 110.

The TMU 140 monitors the temperature of the thermal sensors 115 and ensures that the processor 100 delivers the maximum throughput without any hot spot exceeding the maximum allowed junction temperature. The TMU 140 may be programmed by software to optimize the highest overall throughput or to give priority to a few application threads running on the processor at the expense of others. For example, the TMU 140 may be programmed using the operating system.

The TMU 140 controls the operating frequency and operating voltage of each processor core 110. For this embodiment of the invention, each of the processor cores 110 has a different operating frequency, while the entire processor 100 only has two voltages. The top processor cores 110 of the processor 100 operate at a first voltage and the bottom processor cores 110 operate at a second voltage. The invention, however, is not limited to a processor 100 having only two operating voltages. The frequencies of the processor cores 110 are coordinated to match the maximum frequencies the cores 110 can run at each operating voltage. Thus, the frequencies of the top processor cores 110 are limited by the first voltage and the bottom processor cores are limited by the second voltage.

The thermal sensors 115 may be implemented using an adjustable trip point. When the temperature of a given hot spot exceeds this preset trip point, the TMU 140 is notified. The TMU may then adjust the frequency of that processor core 110 or the voltage of that group of cores to reduce the thermal dissipation of the hot spots to below the trip point. Note that power is defined by the expression $$P = V^2 * C * f \qquad \text{(equation 1)}$$

where P represents power, V represents voltage, C represents capacitance, and f is the frequency. From equation 1, it can be seen that reducing the frequency also linearly reduces the power dissipation. Alternatively, power of a processing core 110 may be reduced by lowering the voltage value. However, when an operating voltage of a group of processor cores 110 is adjusted, the frequencies of those cores need to be adjusted correspondingly because the maximum frequency of each processor core 110 is limited by the operating voltage.

Figure 2:
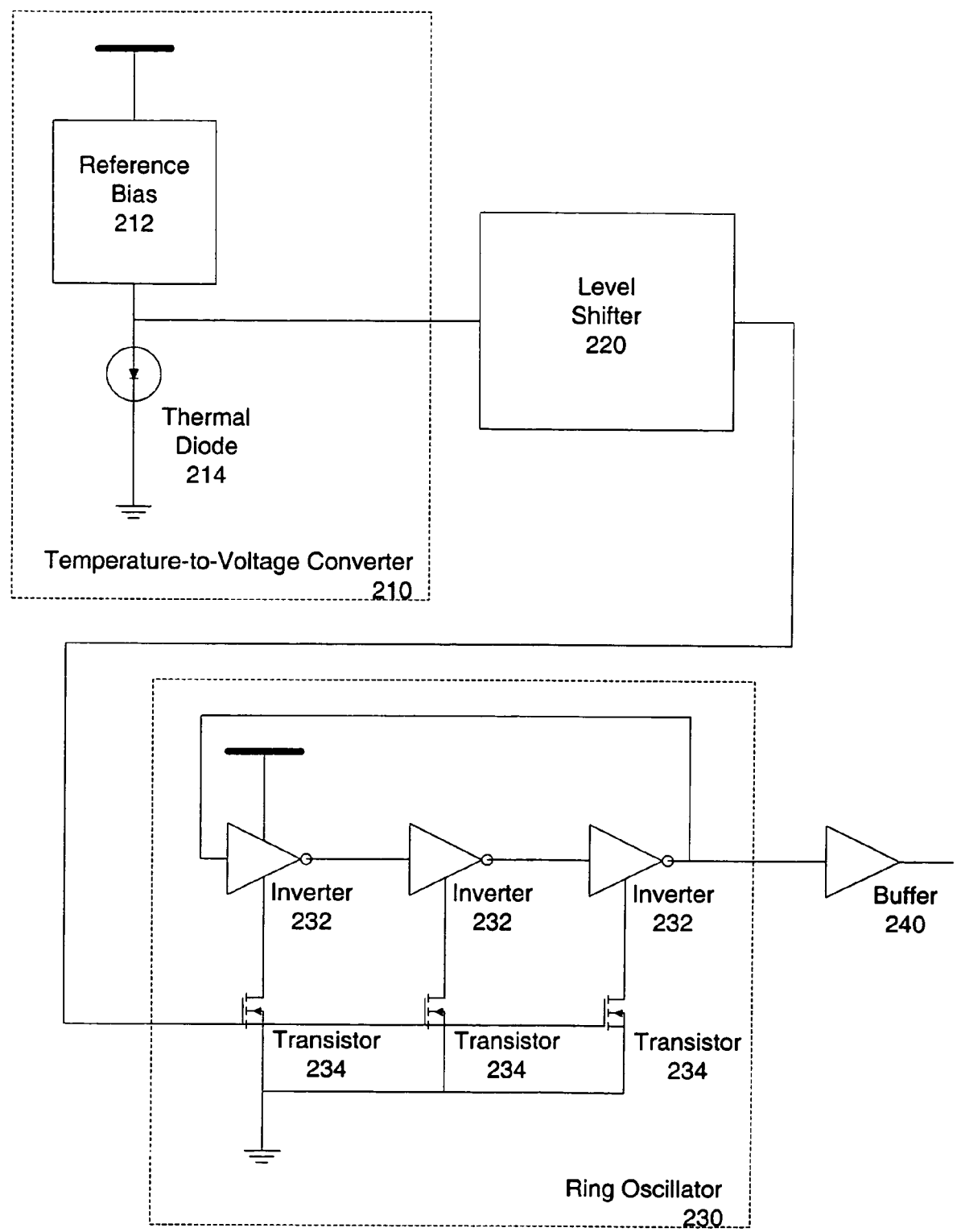
FIG. 2 is one embodiment of a thermal sensor circuit.

An embodiment of a thermal sensor circuit is shown in FIG. 2. The thermal sensor circuit comprises a temperature-to-voltage converter 210, a level shifter 220, a ring oscillator 230, and a buffer 240. The temperature-to-voltage converter 210 may comprise a reference bias 212 and a thermal diode 214. The temperature-to-voltage converter 210 produces an output voltage having a limited range. For example, the output voltage may be in the range of 0.3 volts to 0.7 volts. The level shifter 220 takes the output of the temperature-to-voltage converter and generates a biasing voltage. This generated voltage is then input to the ring oscillator 230.

For this embodiment of the invention, the ring oscillator comprises a plurality of inverters 232. The number of CMOS inverters 232 is an odd integer greater than one in order to generate a toggling signal having a frequency. The number of inverters 232 and the delay of each inverter 232 in the oscillator 230 help to determine the generated frequency. Each of the plurality of inverters 232 is coupled to a pull down transistor 234. The strength and frequency of the signal generated by the oscillator 230 also depend, in part, on the pull down transistors 234 and the biasing voltage that controls the pull down transistors 234. As a result, the frequency of the signal generated by the oscillator 230 is a function of the temperature sensed by the thermal diode 214. An increase in temperature causes the frequency of the signal generated by the oscillator 230 to decrease, while a decrease in temperature causes the frequency of the signal generated by the oscillator 230 to increase. The buffer 240 ensures the signal generated by the oscillator 230 has enough drive strength to reach the TMU.

For another embodiment of the invention, the ring oscillator 230 comprises a plurality of differential amplifiers. Similar to the inverter design described above, the number of differential amplifiers is an integer greater than one. Each of the differential amplifiers may be biased by the biasing voltage generated by the level shifter 220.

Figure 3:
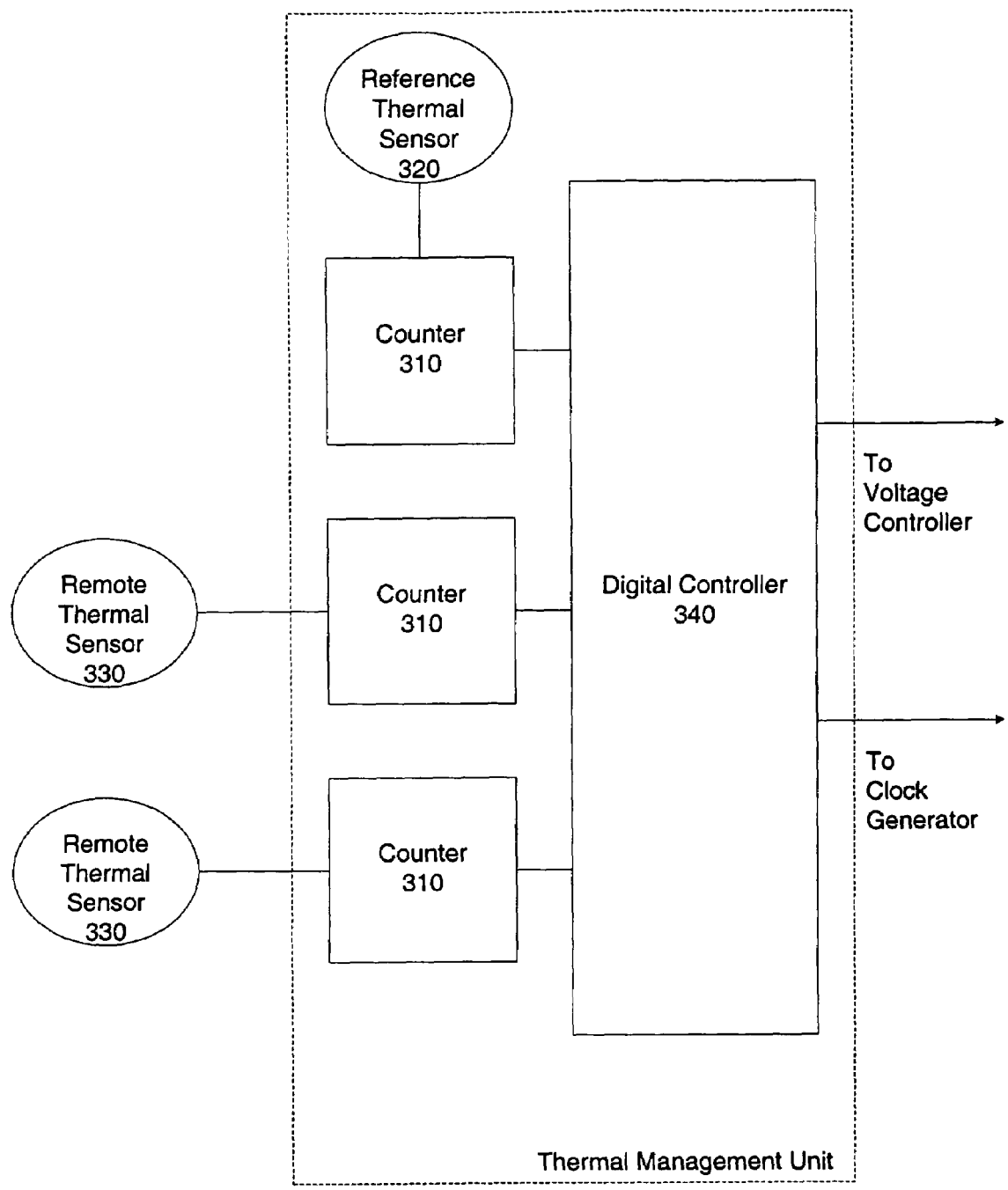
FIG. 3 is one embodiment of a thermal management unit circuit that computes the frequency of each processor core.

An embodiment of a TMU circuit in a processor is depicted in FIG. 3. This TMU circuit comprises a plurality of counters 310. Each of the counters 310 is coupled to a digital controller 340. Moreover, a first counter 310 may be coupled to a reference thermal sensor 320. All other counters 310 may be coupled to thermal sensors 330 located in remote areas of the die such as processor cores. The remote thermal sensors 330 are monitored by the digital controller 340. Specifically, the digital controller 340 may monitor the frequency encoded temperature information from each remote thermal sensor 330. The digital controller 340 compares the remote temperatures against the local temperature reference as sensed by the reference thermal sensor 320.

For one embodiment of the invention, the digital controller 340 may compare the time in which a first counter 310, clocked by a first signal generated by a reference thermal sensor 320, takes to count to a predetermined value against the time it takes for a second counter 310, clocked by a second signal generated by a remote thermal sensor 330 to reach the same predetermined value. The digital controller 340 controls when the counters 310 start and stop counting. If the counter 310 clocked by the reference thermal sensor 320 reaches the target value before the counter 310 clocked by the remote thermal sensor 330, the digital controller decreases an operating frequency or an operating voltage of a processing core. It follows that if the counter 310 clocked by the remote thermal sensor 330 reaches the target value before the counter 310 clocked by the reference thermal sensor 320, the digital controller increases an operating frequency or an operating voltage of a processing core. Therefore, adjustments to each processor core voltage and frequency are determined by the digital controller 340 in order to maximize the overall compute throughput of the processor. The operating frequency of each processing core may be adjusted by adjusting the phase locked loops (PLL) that provide clocks to each core.

A look-up table within the digital controller 340 may determine the adjustment values to the frequency and the voltage. Thus, if the difference in temperature between the reference thermal sensor 320 and a remote thermal sensor 330 is large, the adjustment will be greater than if the temperature difference in small. For example, to adjust the frequency of a processing core, the digital controller 340 may look-up a multiplying ratio value of the PLL. The value of the selected multiplying ratio is a function of the difference in temperature between the reference thermal sensor 320 and a remote thermal sensor 330 in that processing core. The frequency of the clock generated by the PLL is dependent upon the selected multiplying ratio.

Alternatively, the adjustment values may be a single step value. For example, the digital controller 340 may be coupled to an oscillating structure of a PLL that generates a processor clock. Under this implementation, as long as the difference in sensed temperature between a remote thermal sensor 330 and a reference thermal sensor 320 is greater than a specified limit, an adjustment in frequency or voltage will be made by the digital controller 340 at the step value. While this single step value implementation may not be as quick in reducing power dissipation on a processor, it reduces the design complexity and takes up less die area than a look-up table implementation.

For another embodiment of the invention, the digital controller 340 compares the number of signal transitions of a signal generated by a reference thermal sensor 320 against the number of signal transitions of a signal generated by a remote thermal sensor 330 over a given period of time. The counters 310 are used to count the signal transitions from the reference thermal sensor 320 and the remote thermal sensor 330 signals. The larger the count value over the given time period, the cooler the sensed area. Thus, if the area of the reference thermal sensor 320 is determined to be cooler than the area of a given remote thermal sensor 330, the digital controller 340 reduces the operating frequency or the operating voltage of the processor core of where that remote thermal sensor 330 is located. Similarly, if the area of the reference thermal sensor 320 is determined to be hotter than the area of the remote thermal sensor 330, the digital controller 340 increases the operating frequency or the operating voltage of the processor core of where the remote thermal sensor 330 is located.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. An apparatus comprising:
   a processor core of a processor; and
   a thermal sensor circuit, placed in, or in close proximity to, a location in the processor that has a higher junction temperature than other locations of the processor, to sense a temperature of the location, wherein the sensed temperature is used to control an operating frequency and operating voltage of the processor core, wherein the thermal sensor circuit comprises:
- a temperature-to-voltage converter circuit which outputs a voltage dependent upon a sensed temperature of the processor core of the processor; and
- a ring oscillator coupled to the temperature-to-voltage converter circuit, wherein the ring oscillator generates a digital signal having a frequency which is a function of the sensed temperature.

2. The apparatus of claim 1, further comprising:
a level shifter coupled to the temperature-to-voltage converter circuit and the ring oscillator, wherein the level shifter reads the voltage output from the temperature-to-voltage converter circuit and generates a bias voltage.

3. The apparatus of claim 2, wherein the bias voltage generated by the level shifter biases the ring oscillator.

4. The apparatus of claim 3, wherein the ring oscillator comprises a plurality of inverters, wherein each of the plurality of inverters is coupled to a pull down transistor that biases the ring oscillator.

5. The apparatus of claim 1, wherein the digital signal frequency is proportional to the sensed temperature.

6. The apparatus of claim 5, wherein the digital signal frequency decreases if the sensed temperature increases.

7. The apparatus of claim 1, further comprising:
a counter coupled to the thermal sensor circuit to count a number of cycles of the digital signal over a period of time.

8. The apparatus of claim 7, further comprising:
a digital controller coupled to the counter, the digital controller to compare the number of cycles of the digital signal to a reference value, wherein if the number of cycles is greater than the reference value, the operating frequency of the processing core of the processor is decreased.

9. The apparatus of claim 8, wherein the operating frequency of the processor core of the processor is increased if the number of cycles is less than the reference value.

10. The apparatus of claim 8, further comprising:
a phase locked loop (PLL) coupled to the digital controller, the PLL to provide a clock, having the operating frequency to the processor core of the processor, the digital controller to adjust the PLL.

11. The apparatus of claim 10, wherein the digital controller adjusts a multiplying ratio of the PLL.

12. The apparatus of claim 10, wherein the digital controller adjusts an oscillator of the PLL.

13. The apparatus of claim 8, wherein the digital controller is operable to decrease the operating frequency of the processor core when the number of cycles of the digital signal is greater than the reference value, and to increase the operating frequency of the processor core when the number of cycles of the digital signal is less than the reference value.

14. The apparatus of claim 8, wherein the digital controller is operable to decrease the operating voltage of the processing core of the processor when the number of cycles of the digital signal is greater than the reference value, and to increase the operating voltage of the processor core when the number of cycles of the digital signal is less than the reference value.

15. An apparatus comprising:
- a temperature-to-voltage converter circuit, the temperature-to-voltage converter circuit to output a voltage dependent upon a sensed temperature of a processor;
- a ring oscillator coupled to the temperature-to-voltage converter circuit, the ring oscillator to generate a digital signal having a frequency which is a function of the sensed temperature;
- a counter to count a number of cycles of the digital signal over a period of time; and
- a digital controller coupled to the counter, the digital controller to compare the number of cycles of the digital signal to a reference value, wherein the comparison of the number of cycles and the reference value is used to control an operating frequency and an operating voltage of a processing core of the processor.

16. The apparatus of claim 15, wherein the digital controller is operable to decrease the operating frequency of the processing core of the processor when the number of cycles of the digital signal is greater than the reference value, and to increase the operating frequency of the processor core when the number of cycles of the digital signal is less than the reference value.

17. The apparatus of claim 15, wherein the operating frequency of the processor core is increased if the number of cycles is less than the reference value, and is decreased if the number of cycles is greater than the reference value.

18. The apparatus of claim 15, further comprising a phase locked loop (PLL) coupled to the digital controller, the PLL to provide a clock, having the operating frequency to the processor core of the processor, the digital controller to adjust the PLL.

19. The apparatus of claim 18, wherein the digital controller adjusts a multiplying ratio of the PLL.

20. The apparatus of claim 18, wherein the digital controller adjusts an oscillator of the PLL.

21. The apparatus of claim 15, wherein the digital controller is operable to decrease the operating voltage of the processing core of the processor when the number of cycles of the digital signal is greater than the reference value, and to increase the operating voltage of the processor core when the number of cycles of the digital signal is less than the reference value.

* * * * *